3,211,747
N-CARBAMYLMETHYL-MALEIMIDES

Herbert E. Johnson, South Charleston, W. Va., assignor to Union Carbide Corporation, a corporation of New York
No Drawing. Filed Oct. 10, 1961, Ser. No. 144,042
2 Claims. (Cl. 260—326.3)

The present invention relates to novel chemical compounds. More particularly, the invention relates to certain 2-(N-maleimido)amides and their 2-maleamidoamide precursors.

The 2-(N-maleimido)amides of this invention can be represented by the general formula (I)

$$\underset{\substack{\|\\O}}{\overset{\substack{O\\\|}}{\underset{C}{\bigg\langle}}}\!\!\!\!\!\!\!\!\!\!\!\!\!\!\!\!\!\!\!\!\!\!\!\!\!\!\!\!\!\!\!\!\!\!\!\!\!\!N\!-\!\overset{R}{\underset{|}{C}}HCONH_2$$

wherein R is selected from the group consisting of hydrogen, alkyl of from 1 to about 5 carbon atoms, and aralkyl of from 7 to about 10 carbon atoms.

2-(N-maleimido)amides within the scope of this invention are, for example, 2-(N-maleimido)acetamide, 2-(N-maleimido)propionamide, 2-(N-maleimido)butyramide, 2-(N-maleimido)-3-methylbutyramide, 2-(N-maleimido)pentanoamide, 2-(N-maleimido)hexanoamide, 2-(N-maleimido)heptanoamide, 2-(N-maleimido)-3-phenylpropionamide, 2-(N-maleimido)-4-phenylbutyramide, 2-(N-maleimido)-3-phenylpentanoamide, and the like.

Exemplary of the 2-maleamidoamide compounds of this invention, represented by general Formula IV, below, are those corresponding to the above-listed 2-(N-maleimido)amides. Thus, 2-maleamidoacetamide corresponds to 2-(N-maleimido)acetamide, etc.

The compounds of this invention are generally prepared by a two-step reaction which can be depicted as follows:

(1)

$$\underset{(II)}{\overset{\substack{O\\\|}}{\underset{\substack{\|\\O}}{\bigg\langle}}}\!\!\!\!\!\!\!\!\!\!O \;+\; H_2N\overset{R}{\underset{|}{C}}HCONH_2 \longrightarrow$$

(III)

$$HOOCCH=CHCONH\overset{R}{\underset{|}{C}}HCONH_2$$

(IV)

(2)

$$HOOCCH=CHCONH\overset{R}{\underset{|}{C}}HCONH_2 \longrightarrow \underset{(I)}{\overset{\substack{O\\\|}}{\underset{\substack{\|\\O}}{\bigg\langle}}}\!\!\!\!\!\!\!\!\!\!N\!-\!\overset{R}{\underset{|}{C}}HCONH_2$$

(IV)

The first step is effected by reacting maleic anhydride (II) with a substituted α-amino amide (III) in the presence of a base. This reaction is generally carried out in an inert liquid medium comprising water and an inert organic vehicle such as benzene, toluene, xylene, chloroform, ethylene dichloride, carbon tetrachloride, chlorobenzene, methyl ethyl ether, ethyl acetate, and the like. Suitable reaction temperatures can vary broadly but are usually between 0° C. and 60° C. Bases suitable for use in the reaction comprise the inorganic bases, such as sodium hydroxide, potassium hydroxide, barium hydroxide, and the like, as well as inert organic bases such as the pyridines, N,N-dialkyl anilines, trialkylamines, and the like. The second step depicted above can be carried out by heating the maleamidoamide (IV) produced by step (1) with an acid anhydride, preferably acetic anhydride, in an inert organic vehicle at temperatures of from about 20° F. to about 250° F., and preferably at from about 80° F. to about 150° F.

The following examples are illustrative.

EXAMPLE I

*Preparation of 2-(N-maleamido)-3-methylbutyramide*

To a solution of 9 grams of sodium hydroxide in 60 milliliters of water and 250 milliliters of benzene was added 30.5 grams of valinamide hydrochloride (containing 5 percent ammonium chloride) followed by the slow addition of a solution of 22.0 grams of maleic anhydride in 250 milliliters of benzene. A colorless solid precipitated and was collected by filtration after the mixture had been stirred for 1.5 hours at 25–30°. The filter cake was washed well with water and dried to give 40 grams of product having a melting point of 170–175° C. An analytical sample of product was obtained as colorless plates, melting point 171–172° C., after several crystallizations from ethanol.

Analysis:

|  | C | H | N |
|---|---|---|---|
| Calculated for $C_9H_{14}N_2O_4$ | 50.46 | 6.59 | 13.08 |
| Found | 50.65 | 6.44 | 13.02 |

EXAMPLE II

*Preparation of 2-(N-maleimido)-3-methylbutyramide*

A mixture of 24 grams (0.11 mole) of maleylvalinamide, 12.3 grams (0.12 mole) of acetic anhydride and 350 milliliters of dry toluene was heated under reflux for one hour. Upon cooling the mixture, 5.5 grams of acetylvalinamide precipitated, melting point 218°–240° C. The toluene filtrate was evaporated to yield 19.5 grams of a viscous residue that slowly solidified, Crystallization from ethanol afforded 5.0 grams of light-yellow solids, melting point 145–150°. Further crystallization gave the pure product as nearly colorless needles having a melting point of 150–152° C.

Analysis:

|  | C | H | N |
|---|---|---|---|
| Calculated for $C_9H_{12}N_2O_3$ | 55.09 | 6.17 | 14.28 |
| Found | 55.15 | 6.00 | 14.14 |

In analogous fashion, 2-(N-maleimido)pentanoamide-found to have a meltting point of 124–125° C., and 2-(N-maleimido)-3-phenylpropionamide, with a melting point of 105–116° C. were prepared.

The 2-(N-maleimido)amide compounds of this invention are useful as biological chemicals, particularly as bactericides.

As representative of this invention, 2-(N-maleimido)-3-methylbutyramide, hereinafter referred to as Compound 1, was evaluated with regard to its bactericidal activity.

Unless otherwise note, Compound 1 was formulated by dissolving one gram of compound in 50 milliliters of acetone in which had been dissolved 0.1 gram (10 percent of the weight of the compound) of "Triton X-155,"

an alkylphenoxy polyethoxyethanol surfactant, as an emulsifying or dispersing agent. The resulting solution was mixed into 200 milliliters of water to give roughly 250 milliliters of a suspension containing the compound in finely divided form. The thus-prepared stock suspension contained 0.4 percent by weight of compound. The test concentrations employed in the tests described hereinbelow were obtained by diluting the stock suspension with water.

The following tests were employed.

BACTERICIDE TESTS

The test organisms were *Micrococcus pyogenes* var. *aureus*, *Bacillus mesentericus*, *Pseudomonas aeruginosa*, and *Corynebacterium michiganese*. The test organisms were cultured on nutrient agar at controlled conditions of 20° C. and pH 7.0. In each series of tests, a one-half milliliter portion of the bacteria culture was added to a test tube containing a 2-milliliter portion of Compound 1 suspension formulated by diluting the stock suspension with water to give a test compound suspension containing 250 parts of test compound per million parts of suspension. The test tube containing bacteria culture and test suspension was covered and allowed to stand at 20° C. for twenty-four hours. After the twenty-four hour period a loopful of the tube contents was transferred aseptically to a test tube containing an 8 milliliter aliquot of a nutrient broth prepared by dissolving 8 grams of dehydrated Bacto nutrient broth in 1000 milliliters of distilled water. The test tube containing the nutrient broth aliquots had been sterilized by plugging and autoclaving for 20 minutes at 15 p.s.i.g. prior to introduction of the bacteria culture/test suspension mixture. The incoulated broth tubes were incubated at 20° C. for 48 hours. The ability of a compound to inhibit bacterial growth was visually rated, using the following designations.

5=no growth of bacteria
3=slight to moderate growth of bacteria
1—severe growth of bacteria A control test showed severe growth of bacteria.

The results of the four above described series of tests are set forth in Table I, below.

TABLE I

|  | M.p.a. | B.m. | P.a. | C.m. |
|---|---|---|---|---|
| Compound 1 | 5 | 5 | 5 | 5 |

The compounds of this invention are also useful as systemic herbicides and fungicides.

What is claimed is:
1. A compound of the formula

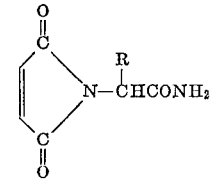

wherein R is selected from the group consisting of hydrogen, alkyl of from 1 to 5 carbon atoms, and phenylalkyl of from 7 to 10 carbon atoms.

2. 2-(N-maleimido)-3-methylbutyramide.

References Cited by the Examiner

UNITED STATES PATENTS 2,956,062   10/60   Lunsford _____ 260—326.3
3,000,945    9/61   Frankel _____ 260—561
3,004,987   10/61   Paris et al. _____ 260—326.3
3,023,240    2/62   Sauers et al. _____ 260—561

NICHOLAS S. RIZZO, *Primary Examiner.*

IRVING MARCUS, WALTER A. MODANCE,
*Examiners.*